Dec. 6, 1955  J. C. COX ET AL  2,726,184
METHOD OF PROVIDING SEALS FOR FILTERS
Filed Nov. 1, 1952
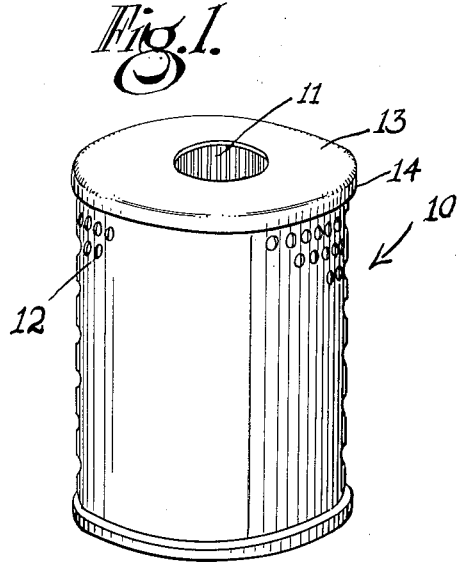
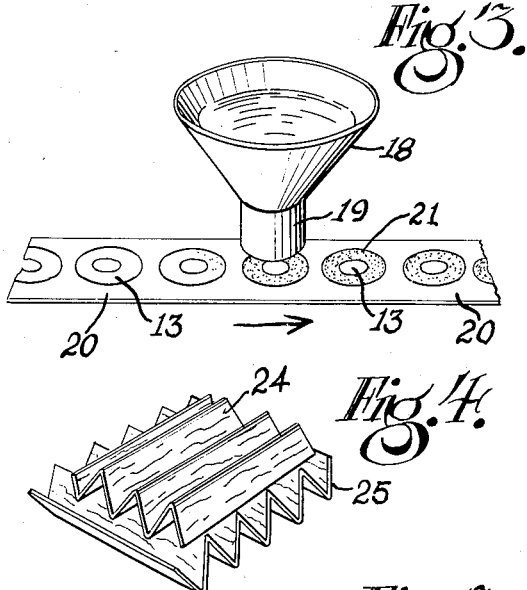
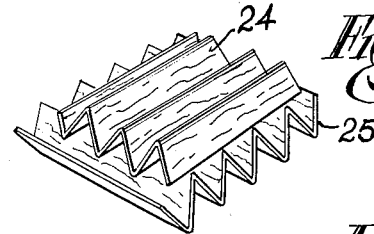
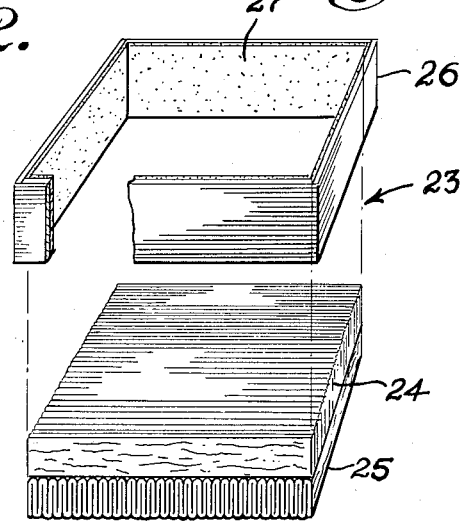
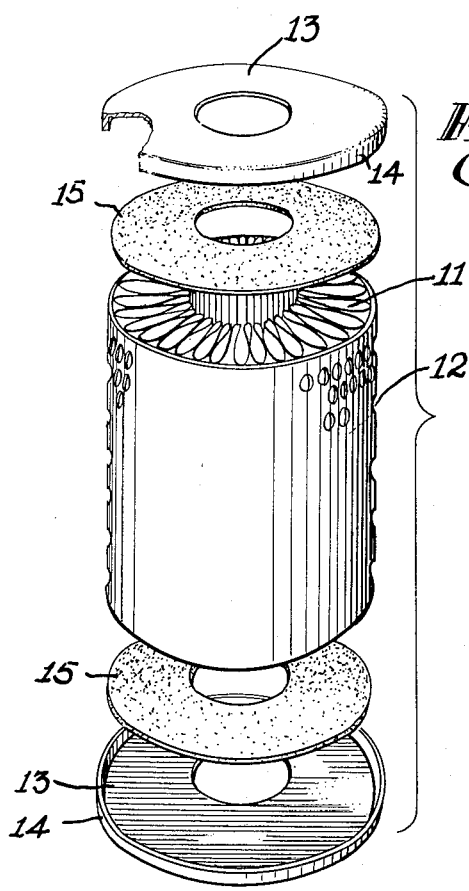
INVENTORS
JOHN C. COX
JOSEPH G. VAN NEST
BY
Kenyon & Kenyon
ATTORNEYS United States Patent Office 2,726,184
Patented Dec. 6, 1955

2,726,184

METHOD OF PROVIDING SEALS FOR FILTERS

John C. Cox, Cranford, and Joseph G. Van Nest, Scotch Plains, N. J., assignors to Purolator Products, Inc., Rahway, N. J., a corporation of Delaware Application November 1, 1952, Serial No. 318,242

2 Claims. (Cl. 154—83)

This invention relates to a method and means for improving the end seals of filter elements for liquids, particularly filter elements of the cylindrical or rectangular convoluted or pleated type.

A primary object of the invention is to provide a simple production method and means of improving the end seals of the filter elements.

A further object is to seal the end discs to the filter elements so that a firm bond will exist, whether the material of the end discs is the same as, or different from, the body of the element, and to provide a strong, water-resistant, and hydrocarbon-resistant bond between them.

Several methods of cementing the end discs of a convoluted filter element to the body are known. The most common is to brush or dip the ends of the body in a viscous liquid glue and then to attach the end discs thereto. But this practice does not lend itself to rapid production, and the resulting products are not consistently uniform because of improper application of glue. For example, application of a thin coat of glue to the ends will not provide sufficient material for a proper bond, and application of a heavy coat will cause the excess material to run down the sides of and clog the body of the filter element. It has long been desired to prevent such fabrication from depending upon personal equations and upon the technique of individual workmen. Further, the existing adhesives that have been used heretofore and that have other desirable qualities necessary for filter manufacture, are incapable of causing an end disc that is made of metal to adhere properly to a paper element body.

Objects and features of this invention are to overcome these disadvantages by the new method and means as set forth in detail hereinafter.

Further objects and features of the invention will become apparent from the following description and accompanying drawings, wherein:

Fig. 1 is a perspective view of a cylindrical type of filter element having a convoluted body and in whose manufacture this invention is practiced;

Fig. 2 is an exploded perspective view showing one method of making such a cylindrical type of filter element;

Fig. 3 is a diagrammatic illustration of an alternative method of manufacturing assemblies of bonding bodies and end discs for use in practicing the invention;

Fig. 4 is a fragmentary perspective view of a pair of assembled convoluted filter bodies of a rectangular type filter element; and Fig. 5 is an exploded perspective view illustrating practice of the invention in assembling such a rectangular type of filter element with its outer cover or frame.

The cylindrical filter element 10 shown in Fig. 1 is of a known type and includes a pleated cylindrical body 11 surrounded, for example, by a perforated protective covering 12, and having sealing members or end caps or discs 13 at opposite ends, said discs 13 in this instance having turned down annular rims 14. These end caps or discs 13 are secured by an adhesive bond to the opposite end edges of the pleated filter body 11 and act to seal off the ends of the channels defined by the pleats. In previous practice the bond has been effected as hereinabove described by manual application of liquid adhesive to the end edges of the pleated filter body 11. Lack of uniformity has occurred with consequent frequent rejects because of poor bonding or filter clogging, the result of differing techniques of individuals applying the adhesive.

The improved method comprises fastening the end discs 13 of Fig. 1 to the end edges of the filter body 11 by means of an adhesive that is in solid sheet form, rather than a liquid.

The particular adhesive used may be one of the rubber base type, such as that manufactured by Worldbestos Company under the name of "Pyrobond," and which is fully disclosed in U. S. Patent No. 2,560,033, issued July 10, 1951, to Nanfeldt. This adhesive is a thermosetting type which is supplied in its unpolymerized state and polymerized by heat and pressure to provide the desired bond. The properties of this adhesive that make it desirable are its water resistance, hydrocarbon resistance, and its ability to bond dissimilar materials, such as paper and metal.

Where a paper-to-paper bond is desired, other adhesives may be used that possess the desired properties, such as being water and hydrocarbon resisting.

The preferred method of performing the bonding operation is best shown in Fig. 2. The adhesive is supplied in sheet form, of any desired thickness, and is punched, stamped, extruded, or cut into the shape of a ring 15 which is dimensioned to fit the inside flat surfaces of the end discs 13. The adhesive of the ring 15 is in its unpolymerized state at this time. The pleated or convoluted filter body 11, covering 12, discs 13 and solid adhesive rings 15 are placed in the relative positions shown in Fig. 2, and are brought together under heat and pressure in any of several well-known machines. The temperature utilized during application of assembling pressure is that which is conventionally used in polymerization processes and is maintained long enough to achieve a polymerization of the adhesive of the rings 15 and their bonding to the end edges of the pleated body 11 and to the inner surfaces of the end discs 13. The preferred temperature condition is the one which permits the shortest polymerization period of time, thus allowing faster production. Obviously, increasing the length of time of the process will permit lowering of the temperature during application of pressure down to a minimum of room temperature.

By the practice of the described method, a strong bond is achieved because of the use of solid rings 15 of adhesive of uniform thickness, resulting in an even, over-all bond. This result occurs whether the end discs 13 are made of metal or of paper, because of the nature of the adhesive of the rings 15. Also, simplicity of manufacture is achieved because it is faster to lay the pre-cut solid adhesive rings 15 in place in the discs 13 than to apply liquid adhesive to the end edges of the pleated body 11 by brushing or by dipping them into a liquid adhesive, as is presently done.

An alternative method of fabrication is shown in Fig. 3. The same basic adhesive described above in an unpolymerized liquid state is stored in a hopper 18, which is stationary. This hopper 18 has an outlet nozzle 19 which will permit discharge of a ring of liquid adhesive. A moving belt 20 passes under the hopper carrying a series of end discs 13. By means of conventional timing and control apparatus (not shown), each disc 13 stops under the hopper nozzle 19, which opens at such time and deposits a fixed quantity of adhesive through its ring-shaped discharge nozzle 19 onto the surface of the end disc 13 as a film or layer of uniform thickness. The disc 13 then moves on with the belt 20, allowing the deposited layer of adhesive to harden or solidify into a solid ring 21 on the face of disc 13. This hardened or solidified ring 21 is similar to the pre-cut ring 15 described previously. With this alternative method of providing solid rings 21 of adhesive the disc 13 carrying the deposited adhesive ring 21 can be stored until ready for use, and each is attached to the end edges of cylindrical pleated bodies 11 by the same type of application of heat and pressure as previously described regarding the first method of practicing the invention.

Other types of filter elements, such as the rectangular unit disclosed by Kovacs in U. S. Patent No. 2,569,243, granted September 25, 1951, may also be manufactured by the methods of this invention. Rectangular filter elements 23 of this type include layers of pleated units 24 and 25 (Figs. 4 and 5) arranged in superposed relationship with the pleats in adjacent layers extending, for example, at right angles to each other. The assembled layers of pleated units are surrounded by a peripheral frame or sealing member 26 to which the end edges of the pleated units 24 and 25 are adhesively bonded to seal the ends of the channels defined by the pleats of the respective units. The same problems of effective uniform bonding between the frame 26 and the end edges of the pleated units 24 and 25 exist as those discussed regarding the problems of bonding of end edges of cylindrical pleated bodies to end discs.

To apply the methods of the instant invention to such rectangular filter elements, it is only necessary to provide solid unpolymerized adhesive inserts 27 of the same adhesive hereinbefore mentioned to fit inside of the frame 26 and then fit the frame 26 bearing such a solid adhesive insert 27 over the assembled layers of filter units 24 and 25. Then heat and pressure to polymerize the adhesive insert 27 is applied to effect bonding of the insert 27 to the inner face of frame 26 and to the end edges of units 24 and 25. The basic adhesive of the insert 27 in the alternative may be applied as a liquid layer from a hopper (not shown) with appropriate nozzle to unfolded frames 26 moving along on a belt like belt 20 or otherwise and allowed to solidify on the frames 26. These, after folding, are assembled with the superposed layers of filter units 24 and 25 as described above and the adhesive is polymerized under heat and pressure as before. Such adhesive bearing frames may be stored until used.

Having thus described the invention, it can be readily seen that changes therein can be made in practice within the scope of the claims without digressing from the inventive idea. There is no intention of limitation, therefore, to the exact details shown and described.

What is claimed is:

1. That improvement in the manufacture of a filter element having a body and two end discs to seal off open opposite ends of said body comprising the steps of depositing a fixed amount of unpolymerized, thermosetting adhesive in liquid form on a surface of said end discs, then allowing the deposited adhesive to harden, aligning a pair of adhesive bearing end discs with opposite ends of said body with their adhesive bearing surfaces facing said ends, and thereafter pressing the aligned end discs against said body and applying heat during said pressing to polymerize the adhesive and bond the aligned adhesive bearing end discs to the opposite ends of said body.

2. That improvement in the method of manufacturing a filter element having a body and metallic sealing means comprising the steps of applying a fixed amount of unpolymerized adhesive in the liquid state to a surface of the metallic sealing means, then allowing the deposited adhesive to solidify and harden on said sealing means in unpolymerized state after its application, aligning the adhesive bearing sealing means with those portions of the body to which the sealing means is bonded and pressing the aligned adhesive bearing sealing means and body portions together to effect bonding while maintaining a polymerization temperature for the adhesive to then polymerize it and bond it both to the metallic sealing means and to said portions of said body.

References Cited in the file of this patent

UNITED STATES PATENTS

| | | |
|---|---|---|
| 2,423,965 | Coyle | July 15, 1947 |
| 2,468,862 | Briggs | May 3, 1949 |
| 2,566,249 | Rainey et al. | Aug. 28, 1951 |
| 2,569,243 | Kovacs | Sept. 25, 1951 |
| 2,592,104 | Arakelian | Apr. 8, 1952 |
| 2,596,513 | Tocci-Guilbert | May 13, 1952 |
| 2,609,932 | Fricke | Sept. 9, 1952 |
| 2,627,350 | Wicks | Feb. 3, 1953 |
| 2,642,188 | Layte et al. | June 16, 1953 |